United States Patent
Neubecker et al.

(10) Patent No.: US 11,662,214 B2
(45) Date of Patent: May 30, 2023

(54) INTERACTIVE VEHICLE NAVIGATION COACHING SYSTEM

(71) Applicant: Ford Global Technologies, LLC, Dearborn, MI (US)

(72) Inventors: Cynthia Neubecker, Westland, MI (US); Pietro Buttolo, Dearborn Heights, MI (US); Ali Hassani, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 16/943,832

(22) Filed: Jul. 30, 2020

(65) Prior Publication Data
US 2022/0034665 A1 Feb. 3, 2022

(51) Int. Cl.
*G01C 21/34* (2006.01)
*G01C 21/36* (2006.01)
*A63F 13/46* (2014.01)

(52) U.S. Cl.
CPC .......... *G01C 21/3415* (2013.01); *A63F 13/46* (2014.09); *G01C 21/362* (2013.01); *G01C 21/3614* (2013.01); *G01C 21/3629* (2013.01)

(58) Field of Classification Search
None
See application file for complete search history.

(56) References Cited

U.S. PATENT DOCUMENTS

| | | | |
|---|---|---|---|
| 2012/0191343 A1* | 7/2012 | Haleem | G08G 1/0969 701/431 |
| 2013/0006518 A1* | 1/2013 | Ozaki | G01C 21/3644 701/411 |
| 2014/0229255 A1* | 8/2014 | Scofield | G06Q 30/0207 705/14.1 |
| 2020/0361476 A1* | 11/2020 | Gaither | B60W 30/18072 |

OTHER PUBLICATIONS

Hu, Xianbio et al., "Behavior Insights for an Incentive-Based Active Demand Management Platform," International Journal of Transportation Science and Technology, vol. 4, No. 2 (2015) pp. 119-134.

* cited by examiner

*Primary Examiner* — Yuen Wong
*Assistant Examiner* — Hongye Liang
(74) *Attorney, Agent, or Firm* — Frank Lollo; Eversheds Sutherland (US) LLP (57) ABSTRACT

A dynamic navigation coach system is programmed to monitor and assist drivers while keeping them engaged en route to the destination. The system may provide driver navigation assistance and training that monitors user navigational skills, driving habits, and environmental factors, and provides dynamically adjustable tools to provide varying levels of navigation assistance in a game play format. The system may selectively provide navigational directions or corrections to the driver when the driver deviates from a scheduled travel route, instead of providing instructions at every driving event.

20 Claims, 5 Drawing Sheets

INTERACTIVE VEHICLE NAVIGATION COACHING SYSTEM

TECHNICAL FIELD

The present disclosure relates to navigation assistance systems, and more particularly, to an adaptable navigational assistance system.

BACKGROUND

Adoption and reliance on technology has a profound effect on our brains. If we think of our brain of as a muscle, a lack of stimulation and active engagement can result in a form of cognitive atrophy. In the automotive arena, technology used for navigation tasks has increased exponentially in recent years. One challenge associated with widespread reliance on Global Positioning Systems (GPSs) is the physiological effect such reliance may have on human cognitive processes, where a portion of brain activity associated with physical orientation, direction, and navigation is significantly reduced with habitual use.

One conventional approach for navigation assistance includes moderating user reliance on technology by monitoring system use time, and alerting the user when a time threshold for usage has been exceeded. However, with habitual reliance on GPS features when driving, this solution may not be helpful to the user, because the driver may not have exercised the ability to self-navigate and could become disoriented or lost without use of the GPS.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured and/or programmed to monitor and assist drivers with navigation while monitoring their tiredness levels and keeping them cognitively engaged by suggesting navigation tips, providing navigation, and providing interactive navigation brain games. Disclosed embodiments may provide driver self-learning algorithms that can provide navigational assistance and training through a dynamic navigation coach system that continually monitors user navigational skills, driving habits, and environmental factors, and provides dynamically adjustable tools with varying levels of navigation assistance in a coaching and game play format.

In an example embodiment, when the driver deviates from a scheduled travel route, the dynamic navigation coach system may provide navigational directions or corrections to the driver at varying points along the route, instead of providing instructions at every point or at every deviation point. This can reduce unnecessary driving instructions being delivered to the driver and concurrently increase the cognitive skills and navigational experience of the driver and other vehicle occupants.

In one example embodiment, the dynamic navigation coach system may monitor an amount of time the user looks at or listens to active route assisted navigation to perform turn-by-turn driving maneuvers. Based on the time and frequency of navigation usage, the vehicle may activate a navigational coaching system that can include levels of interactive navigation tips that vary according to driver performance and user settings. The navigational coaching system may also include a "Navigation Brain Games" system where the user may choose to initiate live interaction with the vehicle rather than passively using the navigation coach system. The Navigation Brain Games system engages the driver in a playful way, using navigation tasks as challenges in a game where the user can earn points and compete against other drivers in the system. The game may involve asking the user to locate the destination on the map without full navigational assistance. The system may award points when the user is close to the real location, when the driver completes independent navigation tasks without "as-needed" reminders for turns or other instructions, and makes minimal or no self-navigating errors (such as missed turns, or failing to actuate turn signals to let the system know that the driver intends to make an upcoming scheduled turn).

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
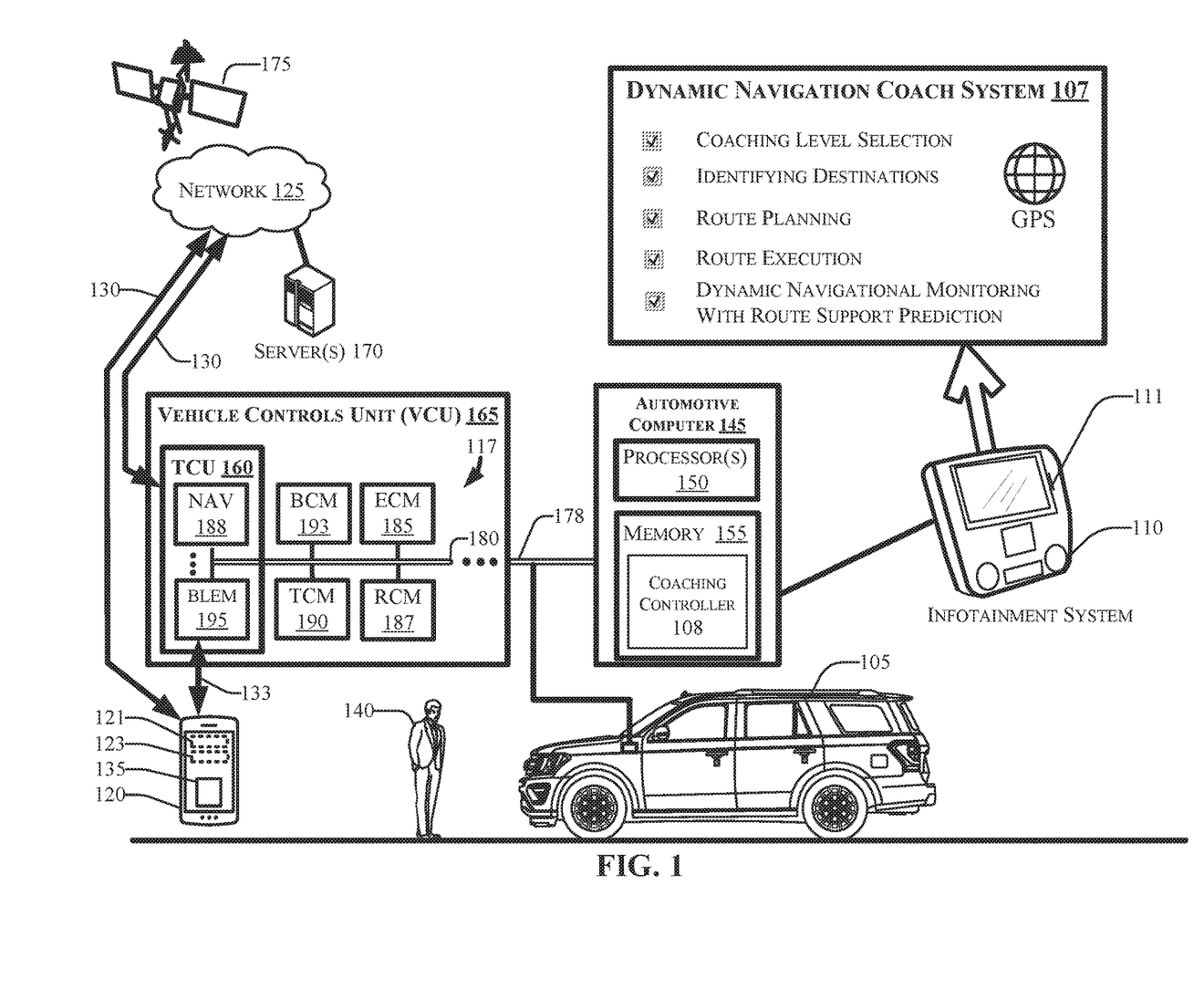
FIG. 1 depicts an example computing environment in accordance with the present disclosure.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145 and a coaching controller 108 stored on a computer-readable memory 155 of the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive signals from a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170.

The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet (not shown in FIG. 1).

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Exemplary drive systems can include various types of internal combustion engines (ICEs) powertrains having a gasoline, diesel, or natural gas-powered combustion engine with conventional drive components such as, a transmission, a drive shaft, a differential, etc.

In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., level-5 autonomy) or in one or more partial autonomy modes (e.g., Level-1 through Level-4 autonomy). An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with a fully autonomous vehicle system that requires no human input for operation, and generally does not include human operational driving controls.

Although a preferred embodiment is directed to a vehicle configured and/or programmed for a human driver, the dynamic navigation coach system 107 may be configured and/or programmed to operate with a vehicle having any level of autonomous vehicle controller. In this case, the dynamic navigation coach system 107 may offer "Navigation Brain Games" to some or all vehicle passengers as a form of game active engagement. For example, other passenger can simultaneously participate in the Brain Games route prediction in form of personal application operating on individual mobile device(s) (not shown in FIG. 1), or via voice inputs. For example, one or more passengers may locate the destination and plan a route on their device application(s), where the fastest passenger to locate the destination and the most time and/or distance efficient route could win points. An efficient route plan may be a route plan having a time or distance within a threshold range of distances or travel time when compared to a route plan generated by the NAV system 107.

According to another embodiment, during active navigation, one or more of the passenger(s) can indicate, either verbally and/or via the application(s), approaching turns. In one example, a passenger may indicate an approaching turn by providing a swipe input on a touch input of their mobile device. Additionally, the NAV coaching system 107 may inform the passenger(s) of interesting landmarks as the vehicle approaches their respective location(s), and ask the passengers to identify the landmarks when they become visible. In one aspect, a correct indication of a landmark may provide additional reward points.

The mobile device 120 generally includes a memory 123 for storing program instructions associated with an application 135 that, when executed by a mobile device processor 121, performs aspects of the disclosed embodiments. The application (or "app") 135 may be part of the dynamic navigation coach system 107, may instantiate a user interface for interacting with the dynamic navigation coach system 107, and may provide information to and/or receive information from the dynamic navigation coach system 107.

In some aspects, the mobile device 120 may communicate with the vehicle 105 through one or more wireless channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more direct wireless connection(s) 133. The wireless connection(s) 133 may include various low-energy protocols including, for example, Bluetooth®, Bluetooth® Low-Energy (BLE), UWB, or Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the dynamic navigation coach system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. As depicted in FIG. 1, the memory 155 may include the coaching controller 108, which may cause the processor(s) 150 to perform steps described according to the disclosed embodiments. The memory 155 may be a non-transitory computer-readable memory storing a coaching controller program code. The memory 155 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM)), flash memory, electronically erasable programmable read-only memory (EEPROM), programmable read-only memory (PROM), etc.

The VCU 165 may share a power bus 178, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, and/or from one or more instruction sets received from the coaching controller 108.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the dynamic navigation coach system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers (e.g., the user 140), inputs from an autonomous vehicle controller (not shown in FIG. 1), the dynamic navigation coach system 107, and/or via wireless signal inputs received via the wireless connection(s) 133 from other connected devices such as the mobile device 120, among others.

The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection(s) 133 may also or alternatively be established between the mobile device 120 and one or more of the ECUs 117 via the respective transceiver(s) (not shown in FIG. 1) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, VCU 165, and/or the dynamic navigation coach system 107 may omit certain computing modules. It should be readily understood that the computing environment depicted in FIG. 1 is one example of a possible implementation according to the present disclosure, and thus, it should not be considered limiting or exclusive.

The automotive computer 145 may connect with an infotainment system 110 that may provide an interface for the navigation and GPS receiver 188, and the dynamic navigation coach system 107. The infotainment system 110 may include a touchscreen interface portion 111, and may include voice recognition features, biometric identification capabilities that can identify users based on facial recognition, voice recognition, fingerprint identification, or other biological identification means. In other aspects, the infotainment system 110 may provide user identification using mobile device pairing techniques (e.g., connecting with the mobile device 120, a Personal Identification Number (PIN)) code, a password, passphrase, or other identifying means.

Figure 2:
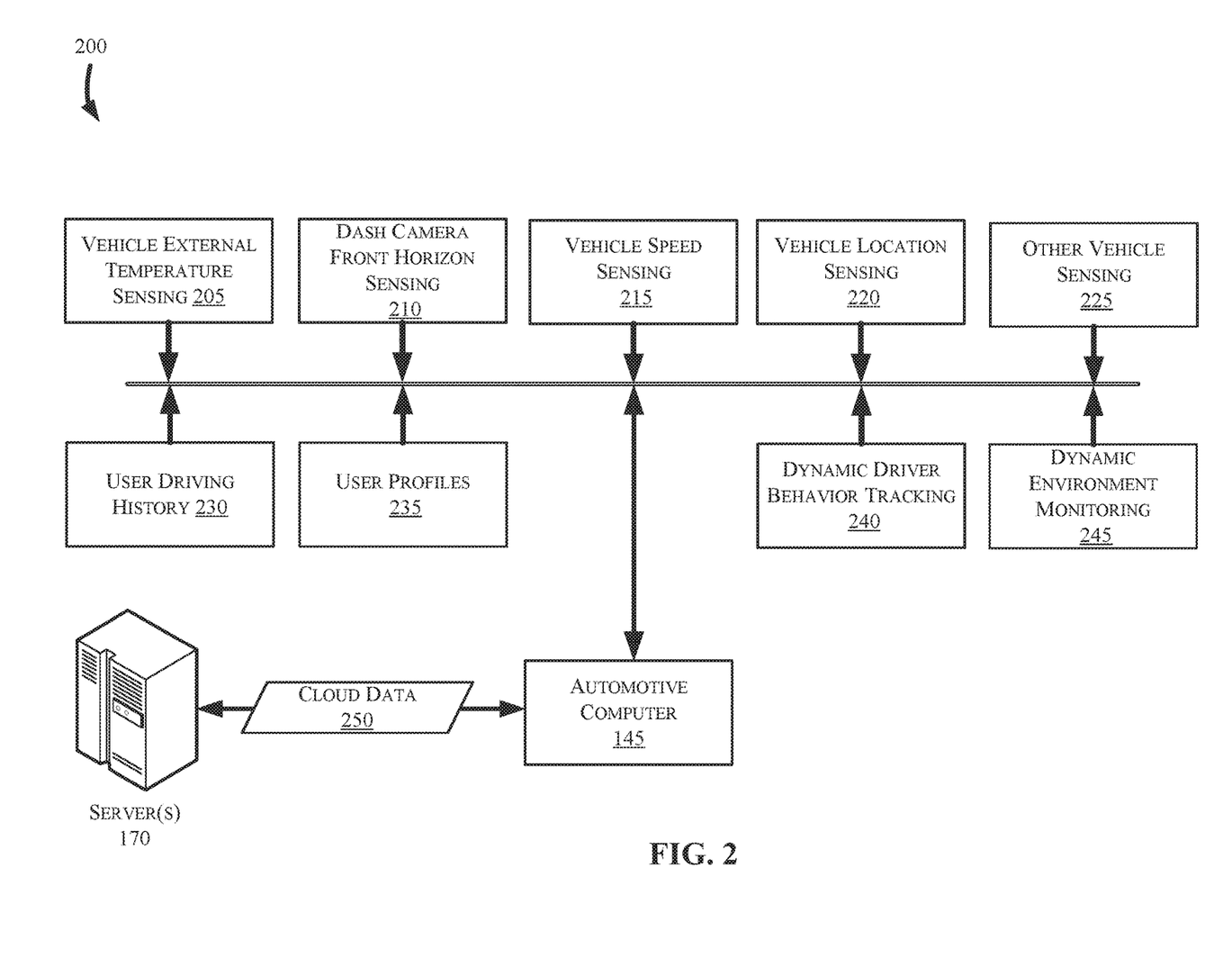
FIG. 2 illustrates an example functional schematic for a dynamic navigation coach system in accordance with the present disclosure.

FIG. 2 illustrates an example functional schematic 200 for the dynamic navigation coach system 107 (hereafter "NAV coach system 107"), in accordance with the present disclosure.

The NAV coach system 107 may utilize vehicle interior and exterior sensing technologies including, for example, vehicle external temperature sensing 205, dash camera front horizon sensing 210, vehicle speed sensing 215, vehicle location sensing 220, and/or other vehicle sensing modules disposed throughout the vehicle 105. For example, the NAV coach system 107 may receive sensor data from the BCM 193, the navigation and GPS receiver 188, the ECMs, the BLEM 195, and/or other ECUs 117 to determine whether the user 140 is cognitively aware of and preparing for an upcoming turn according to a route plan.

The vehicle location sensing functions 220 generally describe communication with the navigation and GPS receiver 188 to monitor an amount of time the user 140 looks at or listens to active route assisted navigation to perform turn-by-turn daily maneuvers. User driving history 230 may functionally describe a record of past trips driven by a particular user identified in user profiles 235, and record driving habits such as the user's propensity to miss turns while using navigational features, common routes and roads traveled, and usage patterns associated with days and times.

Dynamic driver behavior tracking 240 may monitor driver engagement and provide suggestions for changing a coaching level that can include more interaction through a higher coaching mode, or less interaction through a manual mode (that does not provide coaching). Based on the time and frequency of navigation usage, the vehicle 105 may activate the "Navigation Brain Games" that can operate as part of the dynamic navigation coach system 107, where the user may optionally enable the NAV coach system 107 and initiate live interaction with the vehicle 105 as the user operates the vehicle. The NAV coach system 107 may include navigational coaching features that provide variable levels of driver navigational training and coaching, including gentle "nudges" to the driver that prompt the driver to prepare for, make, and/or correct upcoming or missed turns based on observed user actions that are taken and not taken. For example, at a first coaching level, if the driver approaches a highway exit ramp, a light, or a stop sign where they should exit or turn, the NAV coach system 107 may only then validate the driver's action when they turn on their signal. For example, the NAV coach system 107 may provide a verbal indication stating, "Correct, this is your exit," or "Yes, turn here."

Considering known and effective methods of student coaching, it is generally observed that those being coached often learn best when they are allowed to rely on their own developed or developing skills before receiving the coach's instruction. For example, emulating such coaching methods, the NAV coach system may not provide coaching prompts to the user 140 if a navigational error may be corrected at an upcoming fork without a significant loss in time or a significant increase in driving distance. On the other hand, if the NAV coach system 107 determines that the user 140 is not successful in their self-navigation (e.g., by observing one or more acts consistent with driver fatigue) the NAV coach system 107 may then provide the verbal indication that passing the upcoming fork would make them late. The NAV coach system 107 may allow the user 140 to take the action and then coach an improvement to their choice, such as, for example, "The next exit may have been more direct."

In another aspect, if the user 140 does not provide an indication that they intend to make an upcoming turn in accordance with a planned route, such as, for example, engaging a turn signal, then system 107 may only then coach the user 140 when they reach a distance threshold, where the system provides the verbal coaching in a way that provides sufficient time for the user 140 to perform the acts needed to make a turn, but not so soon that the coaching startles them. For example, the vehicle 105 may drive on a 4 lane road and need to turn right at an upcoming intersection to comply with a scheduled route. If the vehicle 105 is in the right-most lane and the user 140 has not engaged the vehicle turn signal, as the vehicle approaches the intersection, the NAV coach system 107 may provide a verbal prompt indicating, "You should turn right on Maple." But if the vehicle 105 is driving in a far-left lane and has not engaged their turn signal nor made a lane change to the right, then the NAV coach system 107 may elect to do nothing until they pass the point and then pop-up reroute instructions. In one aspect, the NAV coach system 107 may determine the subsequent prompt based on a current state of the coaching level (described in greater detail with respect to FIG. 3A).

The interactive prompts and suggestions provided by the NAV coach system 107 may also include responses to user-requested coaching. For example, the user may verbally ask, "Do I turn here?" In response, the NAV coach system 107 may provide a verbal answer based on the current coaching level, such as, "No," without providing further assistance. In this way, the NAV coach system 107 may emulate habits of effective coaches and teachers that force the student to self-improve and think through answers to immediate problems or situations. In some aspects, the NAV coach system 107 may award a first number of points responsive to navigation without making a verbal inquiry associated with an upcoming turn, and a second number of points responsive to navigation with making a verbal inquiry associated with the upcoming turn, where the first number is greater than the second number. In other aspects, the NAV coach system 107 may award negative points for a user inquiry.

In other aspects, the NAV coach system 107 may provide an increasing level of detail for higher coaching levels. For example, a higher coaching level may provide an answer to the same verbal inquiry such as, "No, turn on Maple in 30 feet." Continuing the present example, the NAV coach system 107 may simply provide playful banter, again like a human tutor may provide, by stating, "You may need to turn in the next mile." In another aspect, if the vehicle 105 is operating in a city environment, the NAV coach system 107 may provide an audible prompt such as, "One of the next exits may be helpful to use," if the vehicle is currently on a highway. Other prompts are possible and such prompts are contemplated. Accordingly, the present scenarios are provided as examples only, and are not intended to be limiting or exclusive.

The dynamic environment monitoring 245 may include monitoring the operating environment both proximate the vehicle 105, and in other geographic areas that may be associated with a trip route plan. For example, the dynamic environment monitoring 245 may include steps for obtaining traffic and accident information via cloud data 250, and suggesting or altering a route plan according to accidents or high-traffic areas.

Figure 3A:
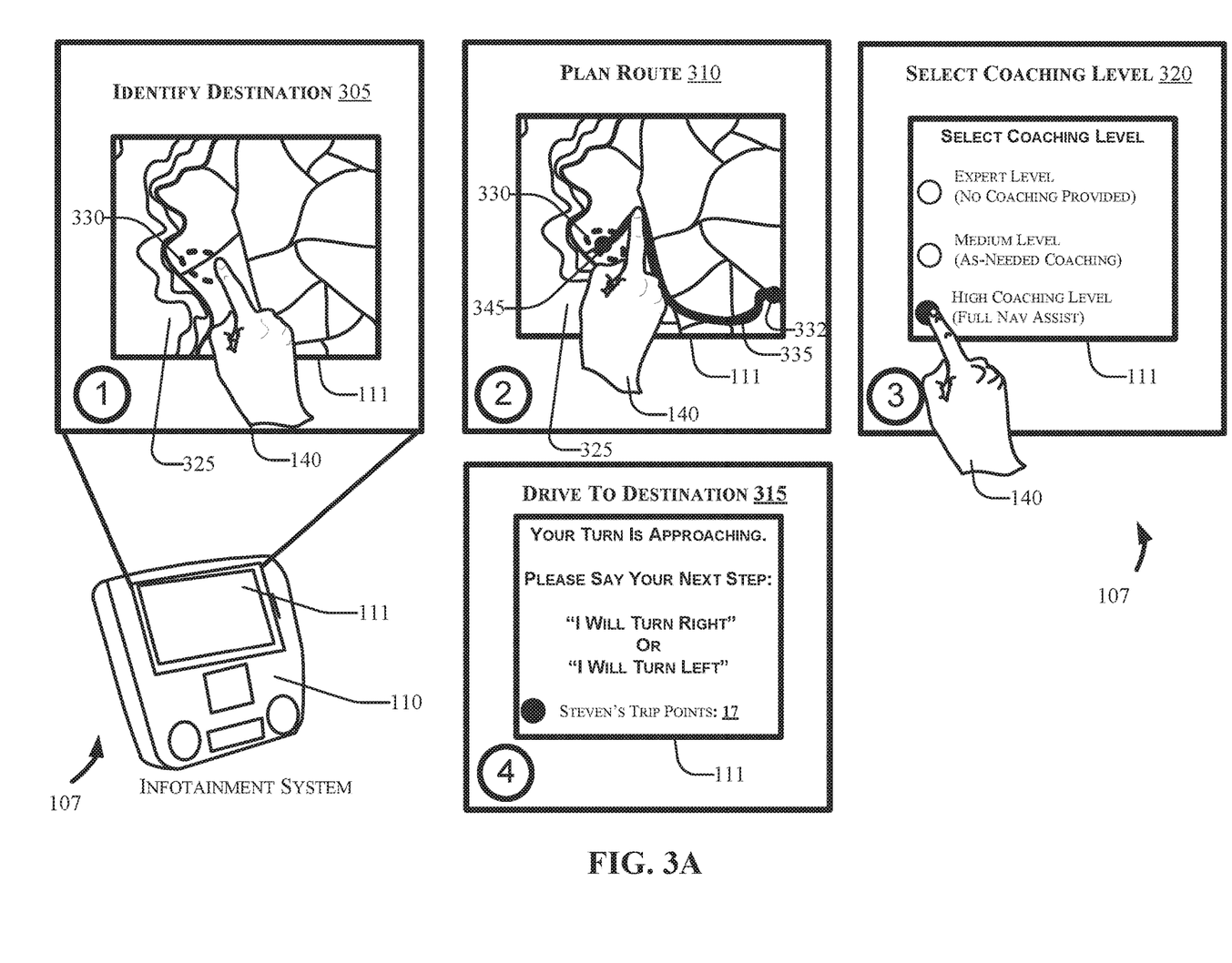
FIG. 3A illustrates example interface steps for implementing the dynamic navigation coach system of FIG. 2 in accordance with the present disclosure.

The NAV coach system 107 may provide interactive coaching prompts as described above, and may also provide Navigation Brain Games that provide points-based games that can engage drivers and passengers, and avoid driver fatigue. FIG. 3A illustrates example interfaces and steps for implementing the NAV coach system of FIG. 2 for coaching, and also Navigation Brain Games, in accordance with the present disclosure.

The infotainment system 110 can include a touchscreen interface portion 111 for displaying map information, selectable menus, and providing navigational game information. The user 140 may utilize the infotainment system 110 to perform steps described hereafter. The NAV coach system 107 may engage the driver (e.g., the user 140) in a playful way, using navigation tasks as challenges in a game where the user 140 can earn points and compete against other drivers using the NAV coach system 107 for the title of best "pilot." In one embodiment, the NAV coach system 107 may include a selectable coaching level (as shown in step 3), features for identifying (or entering) a target destination (depicted in step 1), and features for route planning (depicted in step 2). The NAV coach system 107 may also provide features for route execution (depicted in step 3), where the NAV coach system 107 provides varying levels of navigation assistance through verbal and on-screen navigation directions at strategic times prior to route plan turns such that the user 140 may hear verbal cues regarding an upcoming turn, and stay cognitively engaged by paying attention to upcoming street names, preparing for the navigation task (such as signaling) and, according to the route plan, executing the turn.

Considering these steps in greater detail, according to an example embodiment, the NAV coach system 107 may include three general phases for field use: a destination identification phase 305, a route planning phase 310, and a route execution phase (depicted as "Drive to Destination 315"). The NAV coach system 107 can present user selectable coach mode options according to the user's level of expertise in a coaching level selection phase 320. At the destination identification phase 305 (the first step), the user 140 may select a destination (also referred to herein as a trip destination). In a traditional navigation system, the user identifies a destination on the map by typing in an address/name. Conventional navigation systems typically receive the address input, and display the destination address(es) or location(s) on the map, where the user is tasked with confirming whether one of the displayed locations is the intended trip destination. According to the embodiment depicted in FIG. 3A, the NAV coach system 107 may request that the user 140 locate a trip destination on a map without assistance from the NAV coach system 107. The NAV coach system 107 may generate a street map 325 and provide an identifying name for the address only when the destination address is known.

The NAV coach system 107 may also provide coordinates of the location (coordinates not shown in FIG. 3A), but leave the task of locating the trip destination to the user 140 to identify the trip destination 330 on the street map 325. As the user identifies the trip destination 330 using the on-screen street map 325, the NAV coach system 107 may place an icon 345, which may be a symbol, a dot, or some other identifying icon on the street map 325 to identify the destination. The NAV coach system 107 may reward a correct choice (e.g., when the identified trip destination is identified within a threshold of error) with a point system. For example, the NAV coach system may provide 5 points, 3 points, 1 point, etc., for a correct identification.

In other aspects, the NAV coach system may provide negative points for an incorrect identification, where the identified target destination does not match the coordinates for that destination within a threshold of error. The NAV coach system may further provide hints or other help in the case of an incorrect answer, or multiple incorrect answers. Example hints could include providing an on-screen or auditory prompt indicating nearby features that may help the user 140 identify the correct target destination on the street map 325. For example, the NAV coach system 107 may provide an auditory prompt, text prompt, or combination of an auditory and text prompt indicative of a hint such as, Current navigation systems will automatically select the best route to reach the destination based on identified traffic patterns. Using conventional navigation systems, alternative routes may also be displayed, allowing some degrees of choice such as avoiding highways by taking side roads only, avoiding tolls, etc. In the route planning phase 310 (step 2), after setting the trip destination 330, the NAV coach system 107 may prompt the user 140 to manually enter a route plan 335 on the touchscreen interface portion 111. The NAV coach system 107 may overlay real-time traffic data (not shown in FIG. 3A) on the street map 325, so that the user 140 will also know what areas to avoid. The user 140 may enter a proposed route plan 335 by selecting the travel path from a starting point 332, e.g., the present geographic position of the vehicle 105 on the street map 325, and trace a proposed route plan 335 that avoids identified traffic and/or accidents, and provides a time-efficient and/or distance-efficient route.

According to an embodiment, the NAV coach system 107 may award points for identifying the correct present location (the starting point) 332 on the street map 325, and identify a time efficient route plan that avoids traffic and accidents, to arrive at the trip destination 330 within a threshold of time as compared to a GPS-generated route plan.

As shown in step 3, the NAV coach system 107 may provide dynamically adjustable levels of engagement through a user-changeable coaching level selection. For example, the NAV coach system 107 may include a manual mode (depicted as "Expert Level") that provides no navigation instructions until the user 140 misses a planned turn according to the route plan 335.

A medium coaching mode (depicted as "Medium Level") may be provided that provides no navigation instructions until the vehicle 105 misses a turn on a GPS route plan or a user-selected route plan, such as the route plan 335 depicted.

A high coaching mode (depicted as "High Coaching Level") can provide navigation instructions at a threshold distance before a turn, and at another threshold distance before the turn. For example, the High Coaching Level may provide an advance warning that the user is approaching a right turn on Market Street in one mile when the vehicle is a threshold distance of 1.2 miles from the scheduled turn. Then at around a block before reaching the destination, the NAV coach system 107 may generate another output instruction for the user 140 to turn right in 350 feet, etc. The stated threshold distances and number of reminders are provided as examples only, may be any distance, and should not be considered limiting. It is contemplated that the user 140 may provide system setting inputs (not shown in FIG. 3A) to indicate a number of reminders to provide at each respective coaching mode, and set rules for the game that apply equally to all players.

In one example embodiment, even if the dynamic coaching mode is not enabled (e.g., the user selects a manual mode providing no navigation instruction), the NAV coach system 107 may continually run route guidance in the background. This setting may be useful at times when the user 140 has limited travel time, is tired, or is otherwise uninterested in a more active engagement with the NAV coach system 107. For example, the NAV coach system 107 may determine that the user 140 is tired by observing one or more indicia of driver fatigue such as, for example, missing one or more critical turns, missing a number of turns greater than a selectable threshold for turns, and/or demonstrating any other indications of driver fatigue such as inability to maintain steering within a lane, late braking in traffic, etc. The NAV coach system 107 may make such a determination in any number of ways via known fatigue identification metrics and systems known in the art. Upon detection of driver tiredness, the NAV coach system 107 may suggest navigation coaching engagement to make sure the user interaction stimulates the brain by using Navigation Brain Games, and prompt the user 140 when the user 140 has achieved a threshold number of cumulative points by providing measurable actions consistent with correct navigation, and/or by turning as expected without coaching.

In another aspect, the NAV coach system 107 may automatically adapt the coaching level based on the user's navigational learning over time. For example, as the user 140 accrues positive or negative points for given routes, the NAV coach system 107 may dynamically adjust the coaching level based on the user's current and/or cumulative navigational performance. The NAV coach system 107 may dynamically adjust the coaching level using, among other possible methods, a reinforcement learning algorithm that implicitly defines a "reward" function by the user's driving point score, where the state is the navigation route used as a reference. For example, in one embodiment, the NAV coach system 107 may verbally announce to the driver that one or more correct driving actions (e.g., a correct turn, signaling a turn, etc.) made them win a predetermined amount of points, which could serve to reduce driver anxiety and continually engage the driver as they use the NAV coach system 107.

Figure 3B:
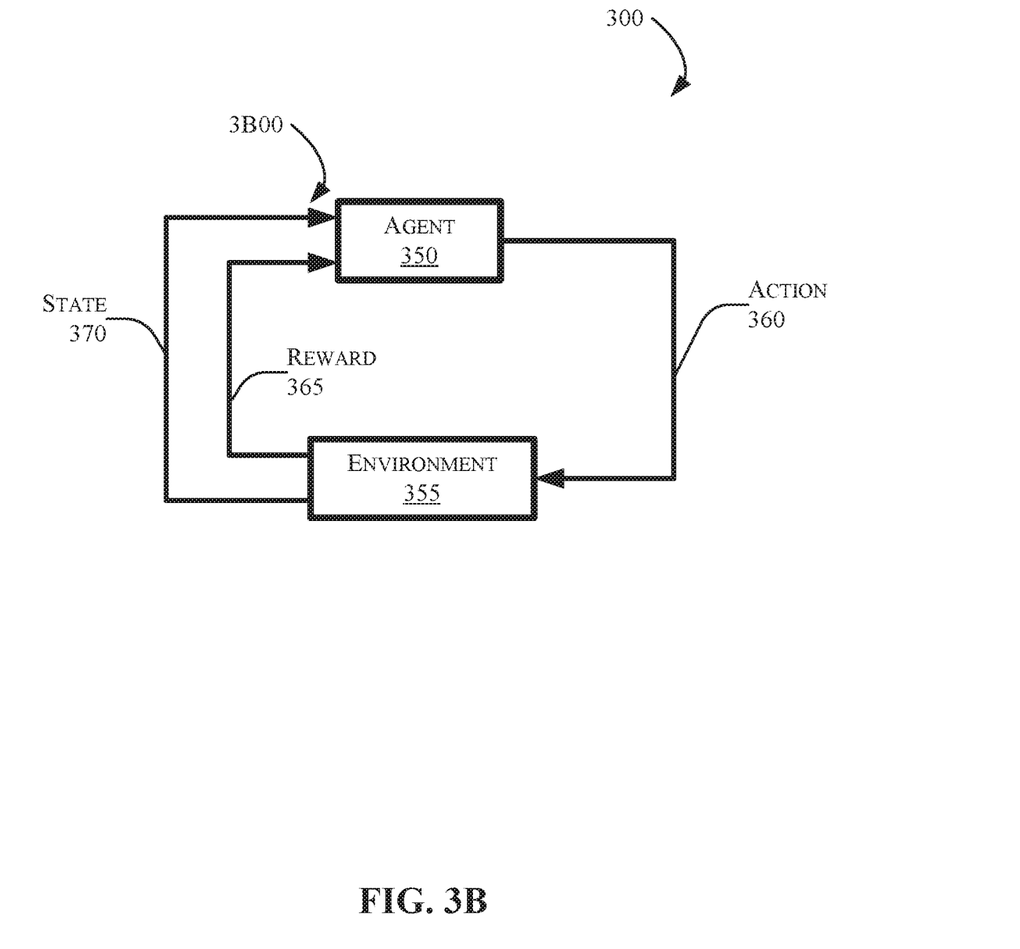
FIG. 3B is a feedback loop diagram illustrating one implementation of an example reinforcement learning algorithm in accordance with the present disclosure.

According to another example, FIG. 3B depicts a feedback loop diagram illustrating one implementation of an example reinforcement learning algorithm 300. An agent 350 (e.g., the NAV coach system 107) may monitor the user's 140 driving habits in the environment 355 and evaluate the user's performance of navigational tasks, which may include the geographic areas in which the vehicle 105 is operating. Monitoring can include determining compliance with an ideal route, and evaluating the user's performance in predicting and executing scheduled turns via the user's actuation of vehicle controls such as turn signals, speed, braking, and other controls.

In one aspect, the agent 350 may monitor the driver's action(s) 360 in the background (that is, while the Navigation Brain Games, and/or other coaching prompts are actively engaged, and also while the user 140 is not actively using the coaching and/or Navigation Brain Games). The agent 350 may continuously monitor historical and current navigation performance, and continuously update a reward function 365 with a cumulative point score, where the NAV coach system 107 compares the observed navigational performance to a state 370 that can include the calculated route to the destination for reference.

With continued reference to FIG. 3A, at the drive to destination phase 315, the NAV coach system 107 may provide navigation instructions based on the coach mode selected in the coaching level selection phase 320, and further based on navigation tasks performed by the user 140 while driving to the trip destination 330.

The NAV coach system 107 may award points based on the selectable coach mode and the navigation tasks performed by the user 140. A traditional navigation system generally provides turn-by-turn instructions as the user progresses along the route. According to one embodiment, the NAV coach system 107 may monitor the driving tasks performed by the user 140 in the background, but the NAV coach system 107 may provide time for the user 140 to engage in the correct navigation action before making a navigation error. For example, as the vehicle 105 approaches a light to make a turn, user engagement of a vehicle turn signal (not shown in FIG. 3A) may indicate the user's intent to change lanes in preparation for completing the navigation task of turning. The action of engaging the turn signal may confirm to the NAV coach system 107 that the user 140 is in control and prepared to make a turn that complies with the route plan (e.g., a correct turn), and does not require active assistance at that time. If the user 140 were to fail to change lanes in preparation for the planned turn, the NAV coach system 107 may provide an active prompt, such as, "Your turn is in 100 feet," or, "Prepare to turn right." The NAV coach system 107 may also output a prompt indicative that the driver achieved X amount of points by turning as expected without coaching, where "X" is a number indicating a cumulative count of points for the current trip.

In one embodiment, the user 140 may also verbally confirm he or she is aware of the navigational task that complies with the route plan. As another example, as shown in the drive to destination phase 315, the NAV coach system 107 may prompt the user 140 to verbally reply "I will turn right" or "I will turn left." The fewer system-generated prompts that are provided, the higher the score earned.

As the route is completed, the NAV coach system 107 may compare the user's route to that which the system would have chosen based on conventional GPS navigation algorithms, and provide an option to the user to change their choice. If the user's initial solution was better than or equally as efficient as the system's algorithm by a predetermined margin, the NAV coach system 107 may award additional points.

The vehicle computer may continue to monitor points of interest and other relevant data to suggest additional stops, for example, if refueling is needed. In another example embodiment, the NAV coach system may provide active user engagement, as well as unobtrusive assistance for increasing navigational skills and engaging user cognitive function while the user is focused on the task of driving. To improve the coaching process, the NAV coach system 107 may provide feedback via an augmented reality heads up display (HUD) (not shown in FIG. 3A), to identify the missed maneuver on the road. Providing such feedback may be either in the form of providing turn-by-turn navigation instructions to return the user to the proper path, and/or may include providing the user 140 a direct indication of which turn was missed.

In another example embodiment, if the user 140 is approaching a highway exit ramp, light, or stop sign where they should exit or turn, then only if the user engages the turn indicator (not shown in FIG. 3A) would the NAV coach system 107 validate the action. For example, the user may perform the navigation task (engage the turn signal and change lanes in preparation for turning, for example). The NAV coach system may confirm the navigation task via an audible prompt, such as, for example, "Correct, this is your exit" or "Yes, turn here."

In another example, the NAV coach system 107 may not prompt the user 140 if the user 140 makes a navigational error that is correctable at a next fork in the route without a significant difference in arrival time or distance as compared with a correct navigational turn. On the other hand, the NAV coach system 107 may provide an advance prompt in such an instance if the user 140 does not provide navigational cues (e.g., turn indicator engagement, lane changes, slowing for a turn, etc.) to indicate that they are contemplating a turn that complies with the route plan. If the NAV coach system 107 does not perceive that the user 140 is contemplating a correct turn, the NAV coach system 107 may provide a prompt indicating that passing the next opportunity to turn would make the user late to their destination.

In another aspect, the NAV coach system 107 may provide a prompt responsive to a turn or route deviation that could be improved. For example, the NAV coach system 107 may provide an indication that, "the next exit may have been more direct."

Figure 4:
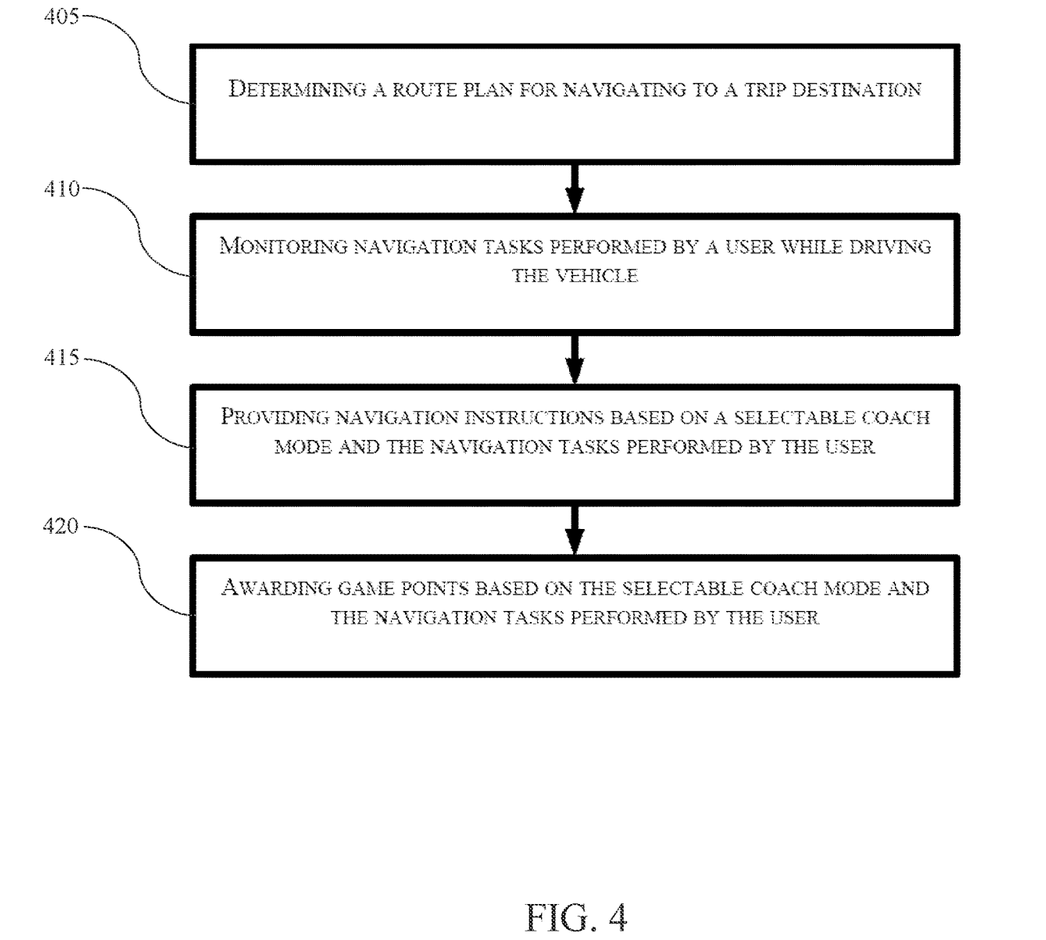
FIG. 4 depicts a flow diagram of an example method of navigational coaching in accordance with the present disclosure.

FIG. 4 is a flow diagram of an example method 400 for providing dynamic navigational suggestions using a navigation system for a vehicle, according to the present disclosure. FIG. 4 may be described with continued reference to prior figures, including FIGS. 1-3. The following process is exemplary and not confined to the steps described hereafter. Moreover, alternative embodiments may include more or less steps than are shown or described herein, and may include these steps in a different order than the order described in the following example embodiments.

Referring to FIG. 4, at step 405, the method 400 may commence with determining a route plan for navigating to a trip destination. Determining the route plan may include receiving an address indicative of the trip destination, and displaying an icon on a user-selectable map identifying the trip destination, and providing an indication of a present location of the vehicle. This step may further include receiving route input indicative of a user-selected route plan from the present location of the vehicle to the trip destination, and generating a Global Positional System (GPS) route plan to the trip destination. In other aspects, this step may further include determining a number of route input portions that match the GPS route plan, and assigning points based on the number of route input portions that match the GPS route plan.

At step 410, the method 400 may further include monitoring navigation tasks performed by a user while driving the vehicle. Monitoring the navigation tasks can include determining a number of turns that do not comply with the route plan, determining a number of turns that comply with the route plan, determining an amount of time using the navigation system, and obtaining traffic information and vehicle accident information associated with the route plan. In some aspects, this step may include providing an option to increase or decrease the selectable coach mode based on the navigation tasks performed by the user.

At step 415, the method 400 may include providing navigation instructions based on a selectable coach mode and the navigation tasks performed by the user. In one aspect, the selectable coach mode is one mode of a plurality of coach mode options that can include a manual mode providing no navigation instructions and a medium coaching mode providing no navigation instructions until the vehicle misses a turn on a GPS route plan or a user-selected route plan. A high coaching mode may include providing navigation instructions at a first threshold distance before a turn and again at a second threshold distance before the turn.

At step 420, the method 400 may further include awarding points based on the selectable coach mode and the navigation tasks performed by the user. Awarding points may include awarding a positive point for making a turn that complies with the route plan, and awarding a negative point for performing one or more of making a turn that does not comply with the route plan, providing navigation instructions based on a selectable coach mode and the navigation tasks performed by the user, and triggering a navigation instruction responsive to a verbal user request.

In the above disclosure, reference has been made to the accompanying drawings, which form a part hereof, and which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for providing dynamic navigational suggestions using a navigation system for a vehicle, the method comprising:
   determining a route plan for navigating to a trip destination;
   monitoring navigation tasks performed by a user while driving the vehicle;
   providing navigation instructions based on a selectable coach mode and the navigation tasks performed by the user, wherein the selectable coach mode is one mode of a plurality of coach mode options comprising:
      a manual mode providing no navigation instructions;
      a medium coaching mode providing no navigation instructions until the vehicle misses a turn on a GPS route plan or a user-selected route plan; and
      a high coaching mode providing navigation instructions at a first threshold distance before a turn and again at a second threshold distance before the turn; and
   adapting automatically the selectable coaching coach mode based on the user's navigational learning over time.

2. The method according to claim 1, wherein determining the route plan for the trip destination comprises:
   receiving an address indicative of the trip destination;
   displaying an icon on a user-selectable map identifying the trip destination and an icon indicative of a present location of the vehicle;
   receiving route input indicative of a user-selected route plan from the present location of the vehicle to the trip destination; and
   generating a Global Positional System (GPS) route plan to the trip destination.

3. The method according to claim 2, further comprising:
   awarding points based on the selectable coach mode and the navigation tasks performed by the user;
   determining a number of route input portions that match the GPS route plan; and
   assigning points based on the number of route input portions that match the GPS route plan.

4. The method according to claim 3, further comprising:
   generating an audible indication that the user has made a threshold number of correct turns; and
   indicating an audible prompt indicative of a number of awarded game points.

5. The method according to claim 3, wherein awarding and subtracting points based on the selectable coach mode and the navigation tasks performed by the user comprises:
   awarding a positive point for making a turn that complies with the route plan; and
   awarding a negative point for performing one or more of:
      making a turn that does not comply with the route plan;
      providing navigation instructions based on the selectable coach mode and the navigation tasks performed by the user; and
      triggering a navigation instruction responsive to a verbal user request.

6. The method according to claim 3, wherein awarding the points based on the selectable coach mode and the navigation tasks comprises:
   providing an instruction to one or more passenger mobile devices to indicate when a landmark is viewable while traveling according to the route plan; and
   awarding a positive game point for an indication that the landmark is viewable from the vehicle.

7. The method according to claim 6, further comprising:
providing an instruction to the one or more passenger mobile devices to locate an efficient route plan to navigate to the trip destination; and
awarding a positive game point for a passenger mobile device of the one or more passenger mobile devices that first locates the efficient route plan.

8. The method according to claim 6, further comprising:
providing an instruction to the one or more passenger mobile devices to locate an efficient route to the trip destination; and
awarding a positive game point for a shortest route in travel time.

9. The method according to claim 3, wherein awarding the points based on the selectable coach mode and the navigation tasks performed by the user comprises:
awarding a first number of points responsive to navigation without making a verbal inquiry associated with an upcoming turn.

10. The method according to claim 1, wherein providing navigation instructions comprises:
providing a navigation direction based on the selectable coach mode and the navigation tasks performed by the user.

11. The method according to claim 1, wherein the selectable coach mode is automatically adapted based on the monitoring of navigation tasks performed by the user over time.

12. The method according to claim 1, wherein monitoring navigation tasks performed by the user comprises:
determining a number of turns that do not comply with the route plan and a number of turns that comply with the route plan;
determining an amount of time using the navigation system; and
obtaining traffic information and vehicle accident information associated with the route plan.

13. The method according to claim 12, further comprising:
providing an option to increase or decrease the selectable coach mode based on the navigation tasks performed by the user.

14. The method according to claim 1, further comprising:
generating an audible prompt for the user to predict a landmark that is viewable while traveling according to the route plan.

15. The method according to claim 1, further comprising:
determining that the user demonstrates acts consistent with driver fatigue; and
generating an audible prompt to engage navigation coaching responsive to determining that the user demonstrates the acts consistent with driver fatigue.

16. A system, comprising:
a processor; and
a memory for storing executable instructions, the processor programmed to execute the instructions to:
determine a route plan for navigating to a trip destination;
monitor navigation tasks performed by a user while driving a vehicle;
provide navigation instructions based on a selectable coach mode and the navigation tasks performed by the user, wherein the selectable coach mode is one mode of a plurality of coach mode options comprising:
a manual mode providing no navigation instructions;
a medium coaching mode providing no navigation instructions until the vehicle misses a turn on a GPS route plan or a user-selected route plan; and
a high coaching mode providing navigation instructions at a first threshold distance before a turn and again at a second threshold distance before the turn;
adapt automatically the selectable coach mode based on user's navigational learning over time; and
award points based on the selectable coach mode and the navigation tasks performed by the user.

17. The system according to claim 16, wherein the processor is further programmed to determine the route plan for navigating to the trip destination by executing the instructions to:
receive an address indicative of the trip destination;
display an icon on a user-selectable map identifying the trip destination and an icon indicative of a present location of the vehicle;
receive route input indicative of a user-selected route plan from the present location of the vehicle to the trip destination; and
generate a Global Positional System (GPS) route plan to the trip destination.

18. The system according to claim 17, wherein the processor is further programmed to execute the instructions to:
determine a number of route input portions that match the GPS route plan; and
assign points based on the number of route input portions that match the GPS route plan.

19. The system according to claim 16, wherein the processor is further programmed to provide navigation instructions by executing the instructions to:
provide a navigation direction based on the selectable coach mode and the navigation tasks performed by the user.

20. A non-transitory computer-readable storage medium in a vehicle controller, the computer-readable storage medium having instructions stored thereupon which, when executed by a processor, cause the processor to:
determine a route plan for navigating to a trip destination;
monitor navigation tasks performed by a user while driving the vehicle;
provide navigation instructions based on a selectable coach mode and the navigation tasks performed by the user, wherein the selectable coach mode is one mode of a plurality of coach mode options comprising:
a manual mode providing no navigation instructions;
a medium coaching mode providing no navigation instructions until the vehicle misses a turn on a GPS route plan or a user-selected route plan; and
a high coaching mode providing navigation instructions at a first threshold distance before a turn and again at a second threshold distance before the turn;
adapt automatically the selectable coach mode based on user's navigational learning over time; and
award points based on the selectable coach mode and the navigation tasks performed by the user.

* * * * *